United States Patent [19]
De Fazio

[11] Patent Number: 4,485,562
[45] Date of Patent: Dec. 4, 1984

[54] VARIABLE STIFFNESS COMPLIANCE DEVICE
[75] Inventor: Thomas L. De Fazio, Watertown, Mass.
[73] Assignee: The Charles Stark Draper Laboratory, Inc., Cambridge, Mass.
[21] Appl. No.: 255,681
[22] Filed: Apr. 20, 1981
[51] Int. Cl.³ .......................... B23B 45/4; G01B 5/25
[52] U.S. Cl. .............................. 33/185 R; 33/169 C; 33/180 P
[58] Field of Search ............ 33/169 C, 185 R, 172 D, 33/180 R; 403/27, 24, 53, 410; 29/406, 407; 267/180; 408/111, 81

[56] References Cited
U.S. PATENT DOCUMENTS
4,202,107  5/1980  Watson ............................ 33/169 C
4,242,017 12/1980  De Fazio ...................... 33/185 R X
4,283,153  8/1981  Brendamour ................ 33/169 C X Primary Examiner—Harry N. Haroian
Attorney, Agent, or Firm—Joseph S. Iandiorio

[57] ABSTRACT

A variable stiffness compliance device for engaging operator means with an engagement member including: a plurality of radial members disposed along radii emanating from a first center of motion, the radial members being stiffer in a first stress range and more compliant in a second stress range; support means for supporting one end of the radial members, for mounting the operator means, and for establishing a stress level in the radial members in the second stress range upon the operator means contacting an engagement member to make compliant the radial members and establish a remote center of compliance at, near or beyond the end of the operator means.

21 Claims, 4 Drawing Figures

VARIABLE STIFFNESS COMPLIANCE DEVICE

FIELD OF INVENTION

This invention relates to a variable stiffness remote center compliance type of device, and more particularly to such a device for accommodation of off-axis loads.

BACKGROUND OF INVENTION

When a remote center compliance type of device other than vertically oriented is required to carry large loads, there results a biasing of the device which causes misalignment between its operator means, e.g. tool, tool mating face, gripper, chuck, docking device, and the part with which it is to engage.

Remote center compliance (RCC) devices establish a center of compliance that is a point in space about which rotational motion and with respect to which translational motion may take place. The remote center may be within the RCC itself or its operator member, or parts held by the operator member, or external to it. A first type of RCC is disclosed in U.S. Pat. No. 4,098,001, Remote Center Compliance System, Paul C. Watson, July 4, 1978. A second type of RCC is disclosed in U.S. Pat. No. 4,155,169, Compliant Assembly System Device, Drake et al., May 22, 1979. Yet another type is disclosed in U.S. patent application Ser. No. 140,768, filed Apr. 16, 1980, Remote Center Compliance Device, Thomas L. De Fazio. All of the above disclosures are incorporated herein by reference. In the first type of RCC the location of the remote center is determined by the geometry of a plurality of radially disposed members whose focus is a point in space at which the remote center of compliance is located. In the second type of RCC device, the location of the remote center is determined by the geometry and stiffness of the radial members as well as by the mechanical stiffness of a deformable element which supports the radial members.

Attempts have been made to overcome this problem by using contructions which remove the weight of the tool or other apparatus from the RCC device. But oftentimes such a construction is not achievable and the problem persists.

SUMMARY OF INVENTION

It is therefore an object of this invention to provide an improved, variable stiffness compliance device for counteracting the influence of off-axis loads.

It is a further object of this invention to provide such a variable stiffness compliance device which maintains stiffness of the compliance device sufficient to support the load until the operator means of the compliance device engages with an engagement member, whereupon compliance is increased to establish a remote center of compliance.

This invention results from the realization that off-axis loads on remote center compliance type devices can be accommodated by maintaining the stiffness in the relevant portions of those devices required to support large off-axis loads and then decrease the tensile stress or increase compressive stress in those portions to make them compliant and establish a remote center of compliance at, near or beyond the end of the operator means.

The invention features a variable stiffness compliance device for engaging operator means with an engagement member. There is a plurality of radial members disposed along radii emanating from a first center of motion; the radial members are stiffer in the first stress range and more compliant in the second stress range, and they are normally in the first stress range. There are operator means and support means for supporting one end of the radial members. Mounting means attached to the other end of the radial members mount the operator means and induce compressive stress in the radial members in the second stress range, upon the operator means contacting an engagement member, to make compliant the radial members and establish a remote center of compliance at, near or beyond the end of the operator means. The mounting means may include translation means for enabling translational movement of the operator means. The translation means may have a second center of motion at infinity. The translation means may include a swash plate mechanism or may include a plurality of parallel members stiffer in the first stress range and more compliant in the second stress range. The support means may include means for applying a force to move the operator means to engage the engagement means. Each of the parallel members may include major motion portions proximate each of its ends, and so may the radial members. Intermediate means are provided for supporting one end of the radial members and one end of the translation means.

Alternatively, the variable stiffness compliance device may include a radial structure having a plurality of radial members disposed along radii emanating from a first center of motion. The radial members are stiffer in a first stress range and more compliant in a second stress range, and are normally in the first stress range. The device also includes a deformable structure having a second center of motion spaced from the first center of motion and means for interconnecting one end of the radial structure and the deformable structure. There is operator means and support means for supporting the other end of one of the structures. Mounting means are attached to the other end of the other of the structures for mounting the operator means and for inducing compressive stress in the radial members in the second stress range upon the operator means engaging with an engagement member, to make compliant the radial members and establish a remote center of compliance at, near or beyond the end of the operator means between the centers of motion.

In another embodiment, the variable stiffness compliance device of this invention includes a plurality of radial members disposed along radii emanating from a first center of motion. These radial members are more compliant in a first stress range and stiffer in a second stress range and are normally in the second stress range. These are operator means and support means for supporting one end of the radial member. Mounting means are attached to the other end of the radial member and mount the operator means. There is a variable stiffness actuator means for selectively inducing tensile stress in the second stress range in the radial member to increase their stiffness and support the operator means, and release some or all of this stress to attain the first stress range when the operator means contacts the engagement member to make the radial members compliant and establish a remote center of compliance at, near or beyond the end of the operator means. The support means may include translation means for enabling translational motion of the operator means. The translation means may have a second center of motion at infinity. The translation means may include a swash plate mechanism or a plurality of parallel members. Each of the parallel members may include major motion portions proximate each of their ends and so may the radial members. Intermediate means may be used for supporting one end of the radial members and one end of the translation means.

DISCLOSURE OF PREFERRED EMBODIMENT

Other objects, features and advantages will occur from the following description of a preferred embodiment and the accompanying drawings, in which.

Figure 1:
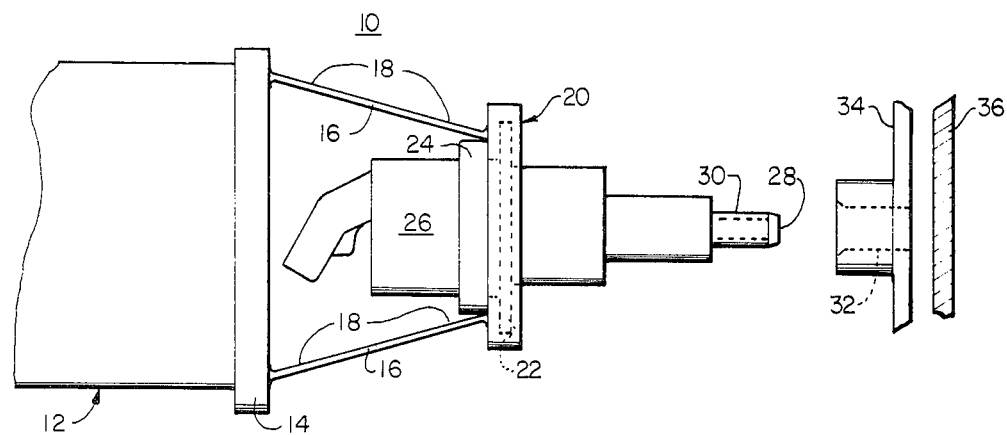
FIG. 1 is a side elevational diagram of a variable stiffness compliance device of the passive compressive type according to this invention.

The invention may be accomplished in a passive, compressive, variable stiffness compliance device for engaging operator means with an engagement member. The operator means may be a tool and the engagement member a jig or workpiece, or the operator means may be a docking mechanism with the engagement member being a mating docking mechanism. There are a plurality of radial members disposed along radii emanating from a first center of motion. These radial members are stiffer in a first stress range and more compliant in a second stress range. They are normally in the first stress range. Typically, the radial members will be more stiff until a compressive force is applied to them to make them more compliant. There are support means such as a plate for supporting one end of the radial members. The support means is typically mounted to a tool, production machine or robot arm which propels the variable stiffness device of this invention. There is an operator means which is typically a tool of some sort, such as a drill or mill or gripper device carrying a part to be installed, which mates with an engagement member such as a workpiece or jig. Mounting means are attached to the other end of the radial members for mounting the operator means. Either one or both of the operator means and support means may be wholly or partially compliant and they may be integral or distinct. The mounting means also induces compressive stress in the radial members in the second stress range upon the operator means contacting the engagement member. Thus as the robot arm pushes the support means and with it the entire variable stiffness compliance device toward the workpiece, the operator means contacts with the engagement member. When this occurs, the force is applied through the mounting means to the radial members. When compressive stress occurs in the radial members, they become more compliant and establish a remote center of compliance at, near or beyond the end of the operator means, which enables them to quickly align the operator means with the engagement means.

Translation means may be provided as a part of the mounting means or in addition to it, for enabling translation of the operator means. The translation means may have a second center of motion at infinity or within the locus of the variable stiffness compliance device. The translation means may include a swashplate mechanism or a plurality of parallel members, which are also stiffer in the first stress range and more compliant in the second stress range and will respond to a compressive stress when the operator means engages with the engagement means to become compliant. The parallel members and the radial members may include major motion portions proximate each of their ends, or they may be deformable throughout their extent. Alternatively, the variable stiffness compliance device may include a radial structure including a plurality of radial members disposed along radii emanating from a first center of motion with the radial members being stiffer in a first stress range and more compliant in a second stress range, and being normally in the first stress range, and in addition may include a deformable structure having a second center of motion spaced from the first center of motion with means for interconnecting one end of the radial structure and the deformable structure.

An active, tensile, variable stiffness compliance device according to this invention may include a plurality of radial members which are more compliant, not stiffer, in the first stress range, and conversely are stiffer in the second stress range. They are normally in the second stress range. Support means support one end of the radial members. This support means too may be a plate or other means interconnected with a robot or automaton. There are operator means and mounting means attached to the other end of the radial members for mounting the operator means. A variable stiffness actuator means is provided for selectively inducing tensile stress in the second stress range in the radial members to increase their stiffness so that they may support the operator means. The variable stiffness actuator means may also induce a stress in the first stress range when the operator means contacts the engagement member to make the radial members compliant and establish a remote center of compliance at, near or beyond the end of the operator means. The support means here may include translation means for enabling translational motion of the operator means. The translation means may have a second center of motion at infinity or within the locus of the variable stiffness compliance device. The translation means may include a swash plate mechanism or a plurality of parallel members. The parallel members and the radial members may include major motion portions proximate each of their ends or may be deformable throughout their extent. In each case, active and passive, one of the stress ranges may include zero stress.

There is shown in FIG. 1 a variable stiffness compliance device 10 according to this invention attached to a robot 12. Device 10 includes a support means, plate 14, attached to robot 12, and three radial members 16, only two of which are visible. Radial members 16 may include major motion portions 18 proximate each end, as shown in phantom, or they may be generally deformable throughout their extent. Mounting means, swash plate 20, is mounted to the other ends of radial members 16 and includes within it a slide plate 22 which is fixed to flange 24 of the operator means, tool 26. Because slide plate 22 has a smaller diameter than swash plate 20, the slide plate is able to slide within the swash plate and thus tool 26, which is fixed to slide plate 22, is able to move translationally relative to swash plate 20. The center of motion 28 of radial members 16 occurs just beyond the tip 30 of tool 26. Tip 30 will engage with hole 32 in engagement means, jig 34 to properly align it with workpiece 36. Various configurations of the translation means, swash plate mechanism 20, and radial members 16 are available, as indicated in the previous discussion of two different types of RCC devices, e.g. the swash plate mechanism 20 may be replaced by a deformable structure as in the second type of RCC device dicussed, supra.

In a first load range, quite close to zero, radial members 16 are relatively stiff. Beyond that, as compressive stress increases into a second range, radial members 16 become more compliant. The first load range is an insignificant fraction of buckling load and the second load range is less than, but a significant fraction of the buckling load of the radial members.

In operation, radial members 16 are normally more stiff in the first stress range, so that they easily support the weight of tool 26 without sagging, as robot 12 drives device 10 toward jig 34. When tip 30 contacts jig 34, force is transmitted back through the mounting means, swash plate 20, to radial members 16. Slide plate 22 slides within swash plate 20 thereby enabling translation movement of tool 26. As the force increases, the compressive stress in radial members 16 increases until they become more supple or compliant, sufficiently so that device 10 functions as a compliance device with a remote center of compliance at center of motion 28.

Figure 2:
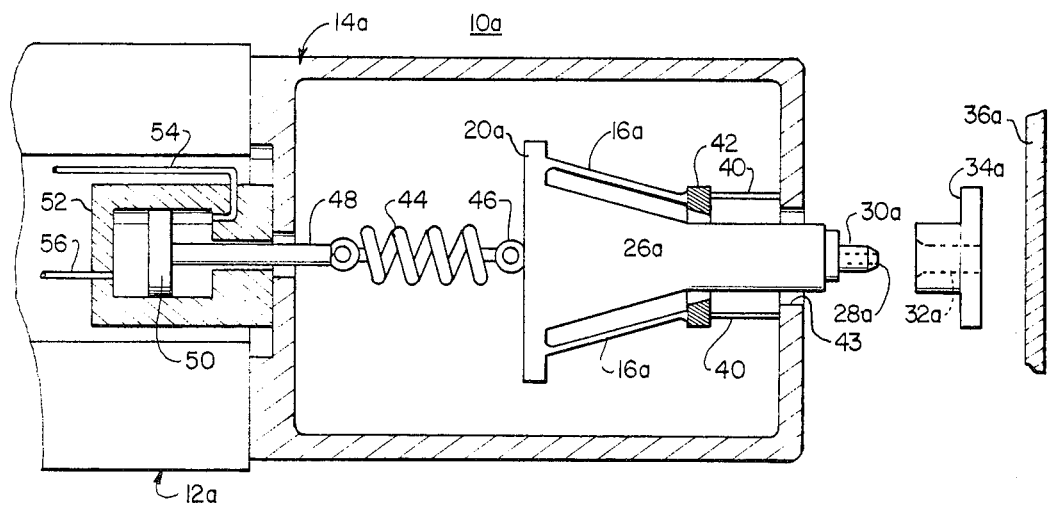
FIG. 2 is a side elevational diagrammatic view of a variable stiffness compliance device according to this invention of the active tensile type.

In another construction, variable stiffness compliance device 10a, FIG. 2, has a support housing 14a connected to robot 12a. Translation means, parallel members 40, only two of which are shown, are interconnected between housing 14a and intermediate member, annular plate 42. Plate 42 connects to one end of radial members 16a whose other ends connect to the mounting means, plate 20a, which supports tool 26a. Parallel members 40 and radial members 16a are quite soft, or compliant, in the first stress range, and would otherwise allow tool 26a to droop and rest against the lower edge of opening 43 in housing 14a. However, a stiff spring 44 is attached to ring 46 on plate 20a. The other end of spring 44 is attached to rod 48 of piston 50 in cylinder 52. Piston 50 may be hydraulically or pneumatically driven to increase tension on spring 44 through inlet 54 to increase the tension of spring 44, and through inlet 56 to decrease the tension of spring 44. Initially, piston 50 is driven to increase the tension on spring 44 and thus place a sufficient tensile stress on members 16a and 40 to provide support for tool 26a. The second stress range is sufficient to support the tool weight with acceptable lateral error, but much less than material yield stress, and the final stress range is low enough to permit RCC-aided insertion with acceptable contact forces.

In operation, robot 12a moves tool 26a toward jig 34a. When tip 30a of tool 26a contacts jig 34a, the support is no longer fully needed, and so piston 50 begins to decrease the force on spring 44. This decreases the tensile stress from the second to the first stress range in members 16a and 40 to make the device compliant so that it can function as a compliant device about remote center of compliance 28a.

Figure 3:
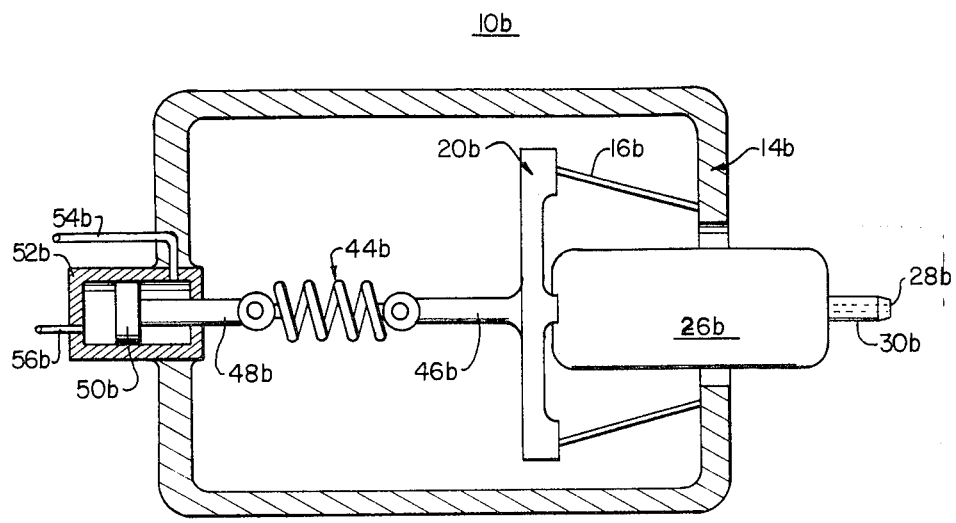
FIG. 3 is a side elevational diagram of alternative construction of an active tensile variable stiffness compliance device according to this invention.
Figure 4:
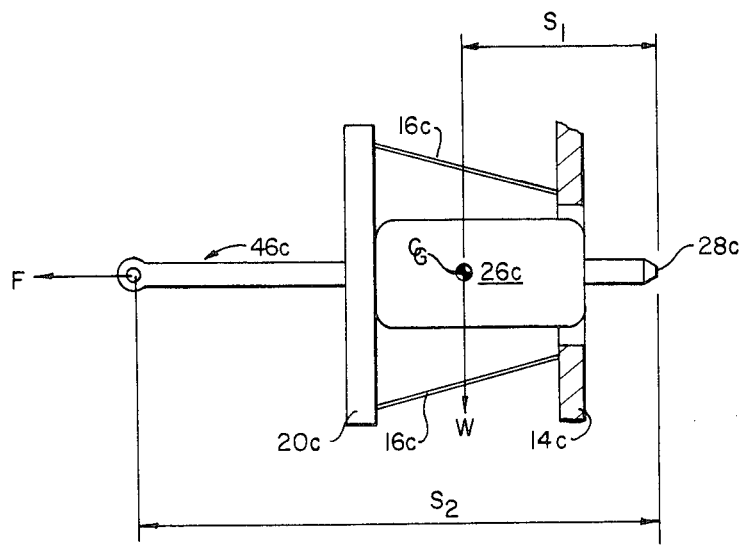
FIG. 4 is a schematic diagram of an RCC illustrating certain parameters of the RCC.

In an alternative construction, tool 26b, FIG. 3, is carried by mounting means constituted by a deformable member 20b supported by deformable members 16b from housing 14b. Tensile spring 44b is connected by means of stem 46b to the center of deformable plate 20b so as not to interfere with the deformable function of the intermediate annular portion of plate 20b. Under force of piston 50b and spring 44b, radial members 16b are held in tension sufficiently to prevent tool 26b from drooping. The length of stem 46b is a significant consideration with respect to the drooping of the tool. With reference to FIG. 4, letting $\theta$ be the droop-angle and ignoring the effect of the wires or members:

$$WS_1 \cong FS_2 \sin\theta.$$

For small $\theta$, $$WS_1 \cong FS_2 \theta,$$

or $$\theta = WS_1/FS_2$$

Thus the harder the pull or the longer the stem, the less the droop. The greater the tool load or the further it is from the remote center, the greater the droop. For the statics of tensioning an RCC see: C. S. Draper Laboratory (Cambridge, MA, U.S.A.) Publication R-1218, "Exploratory Research in Industrial Modular Assembly" by Nevins et al., 6th Rpt. Covering Sept. 1 '77 to Aug. 30 '78, prepared for NSF, in Section IID, pp. 41, 32, and FIG. II.D.1 (p. 43). Subsequently, piston 50b releases the tension on spring 44b and the tensile stress in radial members 16b, permitting them to soften and become compliant to establish a remote center to compliance at 28b.

Other embodiments will occur to those skilled in the art and are within the following claims.

What is claimed is:

1. A variable stiffness compliance device for engaging operator means with an engagement member comprising:
   a plurality of radial members disposed along radii emanating from a first center of motion, said radial members being more stiff in a first stress range and more compliant in a second stress range;
   support means for supporting the diverging end of said radial members;
   operator means; and
   mounting means attached to the converging end of said radial members for mounting said operator means and for inducing compressive stress in said radial members in said second stress range upon said operator means contacting an engagement member, to make more compliant said radial members and establish a remote center of compliance at, near or beyond the end of the operator means, said mounting means including translation means connected to said operator means for enabling translational motion of said operator means.

2. The variable stiffness compliance device of claim 1 in which said translation means has a second center of motion at infinity.

3. The variable stiffness compliance device of claim 1 in which said translation means includes a swash plate mechanism.

4. The variable stiffness compliance device of claim 1 in which said translation means includes a plurality of parallel members more stiff in said first stress range and more compliant in said second stress range.

5. The variable stiffness compliance device of claim 1 in which said support means includes for applying a force to move said operator means to engage said engagement means.

6. The variable stiffness compliance device of claim 4 in which each of said parallel members includes major motion portions proximate each of its ends.

7. The variable stiffness compliance device of claim 1 in which each of said radial members includes major motion portions proximate each of its ends.

8. A variable stiffness compliance device for engaging operator means with an engagement member comprising:
- a plurality of radial members disposed along radii emanating from a first center of motion, said radial members being more stiff in a first stress range and more compliant in a second stress range;
- translation means;
- intermediate means for supporting the converging end of said radial members and one end of said translation means;
- support means for supporting the other end of one of said radial members and translation means; and
- mounting means attached to the other end of the other of said radial members and translation means for mounting said operator means and for inducing compressive stress in said radial members in said second stress range, upon said operator means contacting an engagement member, to make compliant said radial members and establish a remote center of compliance at, near or beyond the end of the operator means.

9. A variable stiffness compliance device for engaging operator means with an engagement member comprising:
- a plurality of radial members disposed along radii emanating from a first center of motion, said radial members being more stiff in a first stress range and more compliant in a second stress range;
- a plurality of parallel members being more stiff in a first range and more compliant in a second stress range, and being normally in said first stress range;
- intermediate means for supporting the converging end of said radial members and one end of said parallel members;
- support means for supporting the other end of one of said radial and parallel members; and
- mounting means attached to the other end of the other of said radial and parallel members for mounting said operator means and for inducing compressive stress in said radial and parallel members in said second stress range, upon said operator means contacting an engagement member, to make compliant said radial and parallel members and establish a remote center of compliance at, near, or beyond the end of the operator means.

10. The variable stiffness compliance device of claim 9 in which said support means includes means for applying a force to move said operator means to engage said engagement means.

11. A variable stiffness compliance device for engaging operator means with an engagement member comprising:
- a radial structure including a plurality of radial members disposed along radii emanating from a first center of motion, said radial members being more stiff in a first stress range and more compliant in a second stress range;
- a deformable structure having a second center of motion spaced from said first center of motion;
- means for interconnecting one end of said radial structure and said deformable structure;
- support means for supporting the other end of one of said structures; and
- mounting means attached to the other end of the other of said structures for mounting said operator means and for inducing compressive stress in said radial members in said second stress range, upon said operator means contacting an engagement member, to make more compliant said radial members and establish a remote center of compliance at, near or beyond the end of the operator means between said centers of motion.

12. A variable stiffness compliance device for engaging operator means with an engagement member, comprising:
- a plurality of radial members disposed along radii emanating from a first center of motion, said radial members being more compliant in a first stress range and more stiff in a second greater stress range;
- support means for supporting one end of said radial members;
- mounting means, attached to the other end of said radial members, for mounting said operator means; and
- variable stiffness actuator means for selectively inducing tensile stress in said second stress range in said radial members to increase their stiffness and support said operator means and inducing a reduced stress in said first stress range when said operator means contacts said engagement member to make said radial members compliant and establish a remote center of compliance at, near or beyond the end of said operator means.

13. The variable stiffness compliance device of claim 13 in which said support means includes translation means connected to said radial members for enabling translational motion of said operator means.

14. The variable stiffness compliance device of claim 14 in which said translation means has a second center of motion at infinity.

15. The variable stiffness compliance device of claim 13 in which said translation means includes a swash plate mechanism.

16. The variable stiffness compliance device of claim 13 in which said translation means includes a plurality of parallel members.

17. The variable stiffness compliance device of claim 16 in which each of said parallel members includes a major motion portions proximate each of its ends.

18. The variable stiffness compliance device of claim 12 in which each of said radial members includes major motion portions proximate each of its ends.

19. A variable stiffness compliance device for engaging operator means with an engagement member, comprising:
- a plurality of radial members disposed along radii emanating from a first center of motion, said radial members being more compliant in a first stress range and more stiff in a second stress range;
- translation means;
- intermediate means for supporting one end of said radial members and one end of said translation means;
- support means for supporting the other end of one of said radial members and translation means;
- mounting means, attached to the other end of the other one of said radial members and translation means for mounting said operator means; and
- variable stiffness actuator means for selectively inducing a tensile stress in said second stress range in said radial members to increase their stiffness and support said operator means and inducing a stress in said first stress range when said operator means contacts said engagement member, to make said radial members compliant and establish a remote center of compliance at, near or beyond the end of said operator means.

20. A variable stiffness compliance device for engaging operator means with an engagement member comprising:

a plurality of radial members disposed along radii emanating from a first center of motion, said radial members being more compliant in a first stress range and more stiff in a second stress range;

a plurality of parallel members being compliant in a first range and stiff in a second stress range;

intermediate means for supporting one end of said radial members and one end of said parallel members;

support means for supporting the other end of one of said radial and parallel members;

mounting means attached to the other end of the other of said radial and parallel members for mounting said operator means; and variable stiffness actuator means for selectively inducing a tensile stress in said second stress range in said radial and parallel members to support said operator means and inducing a stress in said first stress range when said operator means contacts said engagement member to make said radial and parallel members more compliant and establish a remote center of compliance at, near or beyond the end of said operator means.

21. A variable stiffness compliance device for engaging operator means with an engagement member comprising:

a radial structure including a plurality of radial members disposed along radii emanating from a first center of motion, said radial members being more compliant in a first stress range and more stiff in a second stress range;

a deformable structure having a second center of motion spaced from said first center of motion;

means for interconnecting one end of said radial structure and said deformable structure;

support means for supporting the other end of one of said structures; and variable stiffness actuator means for selectively inducing a tensile stress in said second stress range in said radial members to support said operator means and inducing a stress in said first stress range when said operator means contacts said engagement member to make said radial members compliant and establish a remote center of compliance at, near or beyond the end of said operator means.

* * * * *